United States Patent [19]

Ludwig

[11] Patent Number: 5,551,725
[45] Date of Patent: Sep. 3, 1996

[54] VEHICLE AIRBAG INFLATOR AND RELATED METHOD

[76] Inventor: Christopher P. Ludwig, 4038 Normanwood, West Bloomfield, Mich. 48323

[21] Appl. No.: 402,103

[22] Filed: Mar. 10, 1995

[51] Int. Cl.⁶ ................................................. B60R 21/16
[52] U.S. Cl. ................... 280/737; 280/741; 222/3; 102/531; 422/166
[58] Field of Search ........................ 280/737, 736, 280/741, 742, 740; 222/3; 102/530, 531; 422/164, 165, 166, 167

[56] References Cited

U.S. PATENT DOCUMENTS

| | | | |
|---|---|---|---|
| 3,450,414 | 6/1969 | Kobori | 280/735 |
| 3,642,304 | 2/1972 | Johnson et al. | 280/737 |
| 3,655,217 | 4/1972 | Johnson | 280/737 |
| 3,663,036 | 5/1972 | Johnson | 280/737 |
| 3,674,059 | 7/1972 | Stephenson | 280/737 |
| 3,723,205 | 3/1973 | Scheffee | 280/741 |
| 3,773,353 | 11/1973 | Trowbridge et al. | 280/737 |
| 3,788,667 | 1/1974 | Vancil | 280/737 |
| 3,806,153 | 4/1974 | Johnson | 280/737 |
| 3,868,124 | 2/1975 | Johnson | 280/737 |
| 3,869,143 | 3/1975 | Merrell | 280/737 |
| 3,930,666 | 1/1976 | Lynch et al. | 280/737 |
| 3,944,249 | 3/1976 | Smith et al. | 280/742 |
| 3,986,456 | 10/1976 | Doin et al. | 280/741 |
| 4,021,275 | 5/1977 | Kishi et al. | 280/741 |
| 4,062,288 | 12/1977 | Millray | 222/3 |
| 4,097,241 | 6/1978 | Garner et al. | 222/3 |
| 4,131,300 | 12/1978 | Radke et al. | 280/737 |
| 4,136,894 | 1/1979 | Ono et al. | 280/729 |
| 4,200,615 | 4/1980 | Hamilton et al. | 422/166 |
| 4,243,248 | 1/1981 | Scholz et al. | 280/735 |
| 4,437,681 | 3/1984 | Adams et al. | 280/733 |
| 4,877,264 | 10/1989 | Cuevas | 280/731 |
| 4,907,819 | 3/1990 | Cuevas | 280/736 |
| 4,923,212 | 5/1990 | Cuevas | 280/736 |
| 4,928,991 | 5/1990 | Thorn | 280/738 |
| 4,931,112 | 6/1990 | Wardle et al. | 280/741 |
| 4,998,751 | 3/1991 | Paxton et al. | 280/741 |
| 5,015,309 | 5/1991 | Wardle et al. | 149/19.1 |
| 5,016,914 | 5/1991 | Faigle et al. | 280/741 |
| 5,022,674 | 6/1991 | Frantom et al. | 280/741 |
| 5,024,160 | 6/1991 | Canterberry et al. | 280/741 |
| 5,031,932 | 7/1991 | Frantom et al. | 280/741 |
| 5,033,772 | 7/1991 | Frantom et al. | 280/737 |
| 5,054,811 | 10/1991 | Unterforsthuber et al. | 280/742 |
| 5,056,815 | 10/1991 | Geisreiter | 280/736 |
| 5,060,973 | 10/1991 | Giovanetti | 280/736 |
| 5,060,974 | 10/1991 | Hamilton et al. | 280/736 |
| 5,076,607 | 12/1991 | Woods et al. | 280/737 |
| 5,100,171 | 3/1992 | Faigle et al. | 280/736 |

(List continued on next page.)

FOREIGN PATENT DOCUMENTS 2022194 12/1979 United Kingdom ............... 280/742

Primary Examiner—Brian L. Johnson
Assistant Examiner—Peter C. English
Attorney, Agent, or Firm—Stephen T. Sullivan

[57] ABSTRACT

A vehicle airbag inflator is provided which comprises a contained volume, a gas producing source for producing a main gas in the contained volume, an initiating system for causing the conversion of the gas producing source to the main gas, wherein the main gas comprises a working gas, and at least one exhaust orifice for providing an exhaust path for the working gas from the contained volume and for controlling the flow of the working gas as it is exhausted from the contained volume. The at least one exhaust orifice includes a contained volume closure for selectively creating a fluid-tight seal in the contained volume. The working gas creates a pressure-volume quantity in the contained volume ($PV_{cv}(t)$). The working gas has associated with it a pressure-volume quantity for the cumulative amount of the working gas ($PV_{cum}(t)$), and it also has associated with it a total pressure-volume quantity ($PV_{total}$) when the gas producing source is fully converted to the main gas. The pressure-volume quantity in the contained volume ($PV_{cv}(t)$) reaches a peak ($PV_{peak}$) during the conversion of the gas producing source to the main gas that is at least about one half of the total pressure-volume quantity ($PV_{total}$).

17 Claims, 3 Drawing Sheets

U.S. PATENT DOCUMENTS

| | | | |
|---|---|---|---|
| 5,100,172 | 3/1992 | Van Voorhies et al. | 280/738 |
| 5,104,466 | 4/1992 | Allard et al. | 280/741 |
| 5,109,772 | 5/1992 | Cunningham et al. | 102/275.11 |
| 5,131,680 | 7/1992 | Coultas et al. | 280/737 |
| 5,149,129 | 9/1992 | Unterforsthuber et al. | 280/736 |
| 5,158,323 | 10/1992 | Yamamoto et al. | 280/734 |
| 5,186,491 | 2/1993 | Yoshida et al. | 280/741 |
| 5,226,668 | 7/1993 | Delonge-Immik et al. | 280/737 |
| 5,230,531 | 7/1993 | Hamilton et al. | 280/737 |
| 5,257,819 | 11/1993 | Frantom et al. | 280/737 |
| 5,263,740 | 11/1993 | Frey et al. | 280/737 |
| 5,290,060 | 3/1994 | Smith | 280/737 |
| 5,324,075 | 6/1994 | Sampson | 280/736 |
| 5,335,940 | 8/1994 | Cuevas | 280/737 |
| 5,348,344 | 9/1994 | Blumenthal et al. | 280/737 |
| 5,423,570 | 6/1995 | Kort et al. | 280/736 |

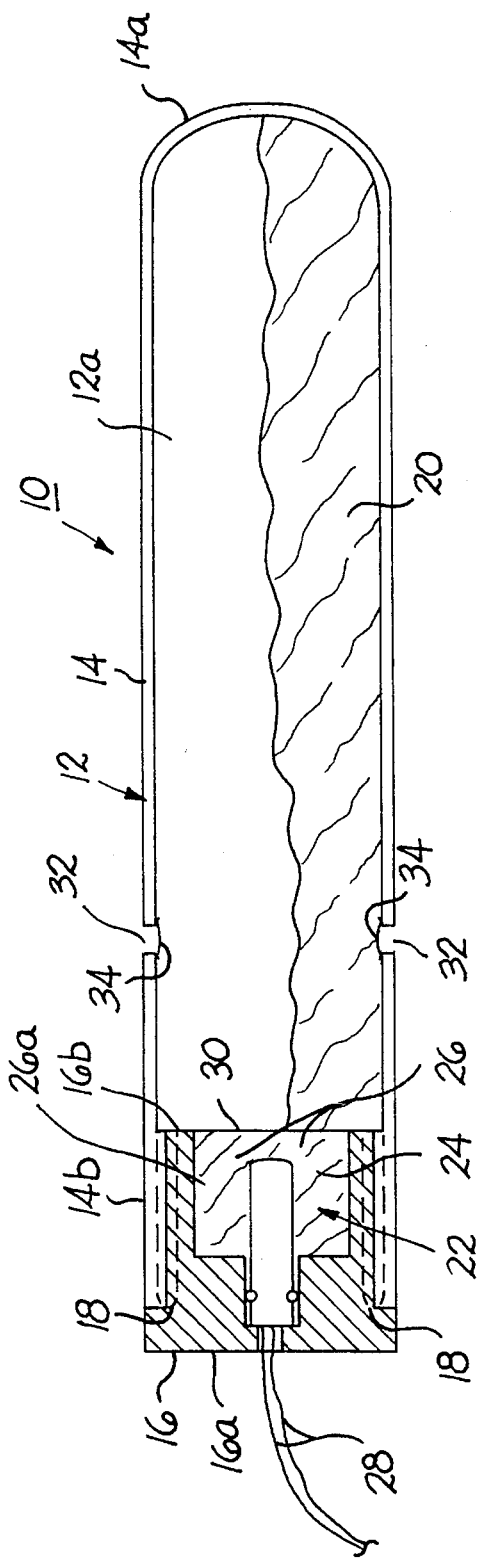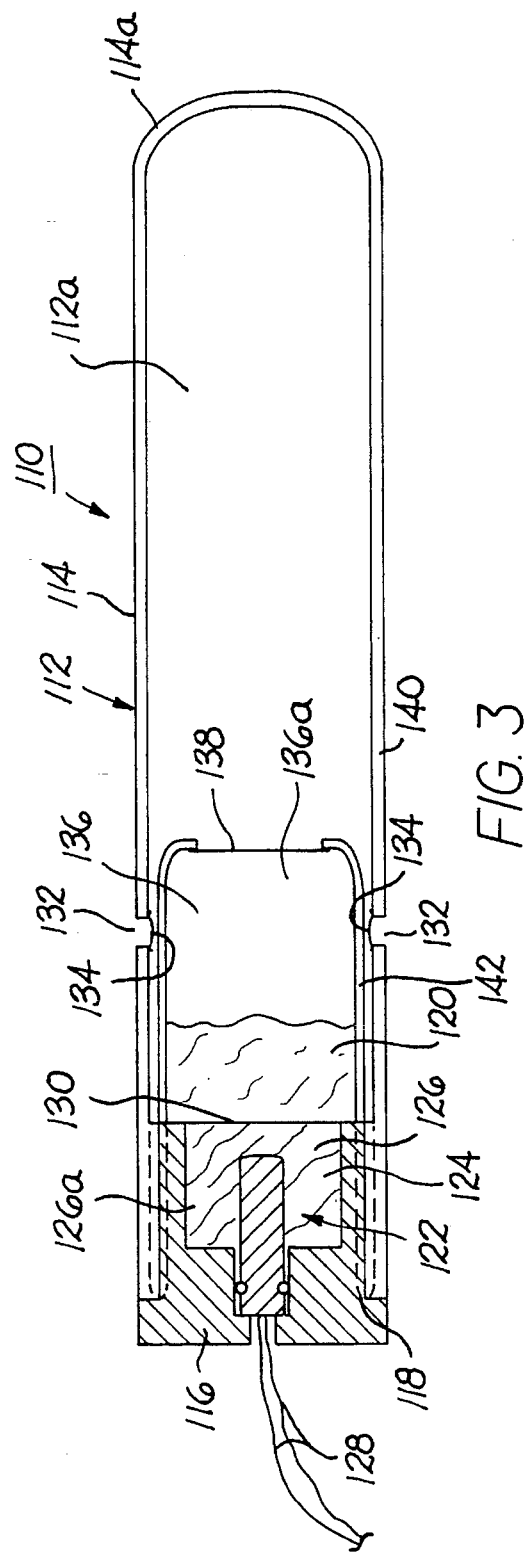

5,551,725

VEHICLE AIRBAG INFLATOR AND RELATED METHOD

FIELD OF THE INVENTION

The present invention relates to vehicle airbag inflation apparatus and methods, for example, for use in vehicle airbag inflator applications. More specifically, the invention relates to relatively simple and low-cost vehicle airbag inflation apparatus and corresponding methods for controllably generating a gas having selected properties to inflate the airbag while staying within defined flow regimes.

BACKGROUND OF THE RELATED ART

In the design of vehicle airbag inflators, it is desirable to controllably generate a gas having selected properties, and for which the flow characteristics of the gas can be controlled during the gas generation. The specific requirements for the airbag inflator depend upon the airbag design and size, whether the airbag is for driver's side, passenger side or side impact application, the specific vehicle in which the airbag system is to be installed, its corresponding crash dynamics, and other factors. In each instance, there are exacting requirements for total gas volume generation, gas generation rate and time, gas toxicity, gas temperature and maximum operating temperature, gas particulate composition, storage requirements, and lifetime requirements.

The vehicle airbag inflator must be stable and safe in its pre-stored, pre-deployed state. This pre-deployed state may be quite prolonged, typically lasting one to several years, and often up to 20 years. During this pre-deployed period, the inflators routinely must endure a wide range of ambient temperatures, humidities, vibrational modes, and other harsh conditions. When called upon, the inflator must perform to specifications with high reliably.

In most applications, the airbag inflators also must be economical to produce and maintain. The airbag inflator should be as light and small as practicable, not only to lessen the direct cost of the inflator itself, but also to lessen the weight and size of the airbag unit for most efficient packaging and minimum mounting costs. This size and weight constraint can impact the inflator design, e.g., by dictating lower storage and operating pressures which allow for thinner pressure vessel walls.

Two design approaches have been widely used for vehicle airbag inflators. One design approach, commonly referred to as the pyrotechnic design approach, involves use of a pyrotechnic charge or propellant grain mounted in a pressure vessel. Upon deployment, an ignition device ignites the propellant, which causes it to react to produce hot gases. The pressure quickly builds in the pressure vessel until a pressure-sensitive output closure ruptures. This opening of the output closure allows the gases to be exhausted from the pressure vessel and out an exit port. The gases continue to flow in this manner until the propellant grain is completely consumed. Examples of such pyrotechnic designs include U.S. Pat. No. 3,985,076, entitled "Gas Generator," U.S. Pat. No. 4,907,819, entitled "Lightweight Non-Welded Gas Generator With Rolled Spun Lip," and U.S. Pat. No. 5,054,811, entitled "Arrangement for an Airbag Gas Generator, " in addition to others.

Pyrotechnic designs have been disadvantageous in vehicle airbag inflator applications in that they require careful control of the reaction rates so that flow rates of the system can be confined to within acceptable limits. The necessary features to provide this control add to the complexity, cost and risk associated with the design. The most important features that must be controlled in a pyrotechnic system are the burn surface area and the corresponding burn rate of the propellant, and the flow characteristics of the filter. The chemical nature of these devices also makes these pyrotechnic designs particularly susceptible to variations in ambient conditions such as temperature. The gas generation rate is undesirably high in warm ambient conditions, and it is undesirably low in cold ambient conditions. For example, the gas output rate for pyrotechnic designs can vary by as much as three to one over the typical operating temperature range for a vehicle airbag inflator system. Considering the various factors, and for the typical pyrotechnic inflator design, there can be significant variability in the gas output from lot to lot for commercial inflator units.

Pyrotechnic inflators designs also have been disadvantageous in that the gases produced in the devices often exceed permissible toxicity limits unless complex filtering is used. The use of filters complicate flow characteristics and add to unit weight and cost. This also has the corresponding disadvantage of making the expended inflators toxic, and requires in some instances that they be handled as hazardous wastes.

The second design approach is commonly referred to as the hybrid design approach. Hybrid designs involve the combination of a pyrotechnic inflator (use of a pyrotechnic charge to heat and/or generate gases as described above) and a pre-stored, pressurized gas. More specifically, a pressure vessel is used to pre-store a pressurized gas, typically an inert gas such as argon. A propellant, which may be contained within the pressure vessel or in a separate compartment, is disposed so that when ignited, the combustion products generated by the propellant come into intimate contact with the pre-stored gases. This quickly heats and expands the pre-stored gases, which builds the pressure in the pressure vessel until a pressure-sensitive output closure as described above ruptures to release the gas and exhaust it from the inflator. Examples of such hybrid designs include U.S. Pat. No. 5,060,974, entitled "Gas Inflator Apparatus," U.S. Pat. No. 5,257,819 entitled "Hybrid Inflator," and U.S. Pat. No. 5,290,060, entitled "Hybrid Gas Generator for Air Bag Inflatable Restraint Systems."

Hybrid inflators are subject to many of the same types of limitations as pyrotechnic inflators. In addition, hybrid designs have been unattractive for some applications in that they require storage of pressurized gas. This results in greater safety risks, thicker pressure vessel walls, larger size, heavier device weights, greater reliability concerns, and in some instances greater costs.

OBJECTS OF THE INVENTION

Accordingly, an object of the present invention is to provide a vehicle airbag inflator and corresponding method having a relatively simple design.

Another object of the present invention is to provide a vehicle airbag inflator and corresponding method having improved consistency in performance from unit to unit and over a wide range of operating temperatures.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a novel vehicle airbag inflator and corresponding method are provided. The airbag inflator and method advantageously employ the principal that a system which operates essentially or largely through gas blowdown has inherent benefits and flexibility. This advantage can be coupled with a design feature in which a prestored material, preferably at about atmospheric pressure, is used to generate the inflation gas on demand, rather than pre-storing a pressurized gas. This gas as produced on demand is used to suddenly pressurize a contained volume to desired pressure levels. This suddenly-pressurized gas can then be released in a manner constituting or resembling blowdown. In this way, the constraining effects of chemical reaction kinetics can be greatly reduced, the reaction regime can be far better controlled to address such constraints as toxicity requirements, and the list of candidate materials that can be used to produce the gas can be greatly expanded. It is further advantageous in that it does not involve storage and subsequent heating of a high pressure gas, as in hybrid inflators.

According to one aspect of the invention, a vehicle airbag inflator is provided that comprises a contained volume, a gas producing source for producing a main gas in the contained volume, the main gas comprising a working gas, an initiating system for causing the conversion of the gas producing source to the main gas, and at least one exhaust orifice for providing an exhaust path for the working gas from the contained volume and for controlling the flow of the working gas as it is exhausted from the contained volume. The at least one exhaust orifice includes at least one contained volume closure for selectively creating a fluid-tight seal in the contained volume.

As the working gas is created, it creates a pressure-volume quantity in the contained volume ($PV_{CV}(t)$). The working gas has associated with it a pressure-volume quantity for the cumulative amount of working gas ($PV_{cum}(t)$). The working gas also has associated with it a total pressure-volume quantity ($PV_{total}$) when the gas producing source is fully converted to the main gas. In accordance with the invention, the pressure-volume quantity in the contained volume ($PV_{CV}(t)$) reaches a peak ($PV_{peak}$) during the conversion of the gas producing source to the main gas that is at least one half of the total pressure-volume quantity ($PV_{total}$). The contained volume preferably comprises a pressure vessel which may have, for example, a substantially cylindrical shape or a substantially toroidal shape. In the preferred embodiments and methods of the invention, an initial pressure may be present in the contained volume. This initial gas has associated with it an initial pressure-volume quantity ($PV_{CV}(t_o)$) prior to conversion of the gas producing source to the main gas. The initial pressure-volume quantity preferably is less than about 10% of the peak pressure-volume quantity ($PV_{peak}$), and the system preferably has an internal pressure of at most about one atmosphere absolute.

The invention further includes a method for inflating a vehicle airbag. The method comprises prestoring a gas producing source. Beginning at a time $t_o$, the gas producing source is converted into a main gas in a contained volume, wherein the main gas comprises a working gas. This creates a pressure-volume quantity in the contained volume ($PV_{CV}(t)$). The working gas has associated with it a pressure-volume quantity for the cumulative amount of the working gas produced ($PV_{cum}(t)$), and the working gas has associated with it a total pressure-volume quantity ($PV_{total}$) when the gas producing source is fully converted to the main gas. The method further includes exhausting the working gas from the contained volume. Also in accordance with the method, the pressure-volume quantity in the contained volume ($PV_{CV}(t)$) reaches a peak $PV_{peak}$ during the conversion of the gas producing source to the main gas that is at least about one half of the total pressure-volume quantity ($PV_{total}$).

BRIEF DESCRIPTION OF THE DRAWINGS

The accompanying drawings, which are incorporated in and constitute a part of the specification, illustrate presently preferred embodiments and methods of the invention. Together with the general description given above and the detailed description of the preferred embodiments and methods given below, they serve to explain the principles of the invention. In the drawings:

FIG. 1 is a side cutaway view of a first preferred embodiment of the invention;

FIG. 3 is a side cutaway view of a second preferred embodiment of the invention;

DETAILED DESCRIPTION OF THE PREFERRED EMBODIMENTS AND METHODS

Figure 2:
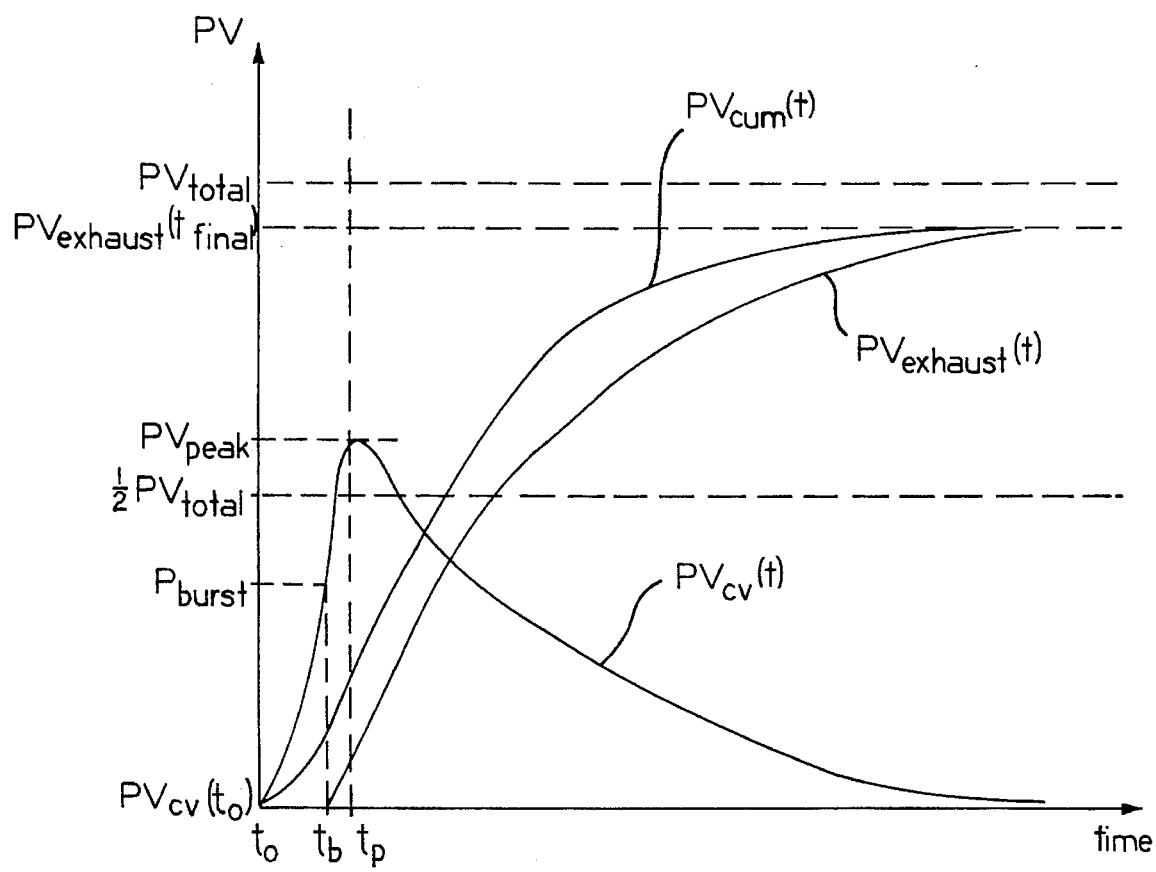
FIG. 2 is a graph illustrating pressure-volume quantities as a function of time for the embodiment of FIG. 1 operating in a preferred operating regime.

Reference will now be made in detail to the presently preferred embodiments and methods of the invention as illustrated in the accompanying drawings. In the drawings, like reference characters designate like or corresponding parts throughout the drawings.

FIG. 1 illustrates a first preferred embodiment of the invention in the form of a vehicle airbag inflator 10 suitable for application as the inflator for a driver's side airbag unit in an automobile. Such an airbag unit typically would include a housing (not shown) located in the central portion of the steering column of the vehicle, an inflator such as the one depicted in FIG. 1 mounted in the housing, and an airbag (not shown) coupled in fluid communication with the inflator but folded in a deflated form and stored in a well in the housing.

The invention includes a contained volume for containing gas. In the preferred embodiment of FIG. 1, this contained volume comprises a substantially-cylindrical pressure vessel 12 formed by a body 14 and a mating endplate 16. Body 14 is a cylindrical steel tube having wall thickness of about 0.08 inches. It is enclosed at a distal end 14a in rounded fashion to avoid seams or corners that might lessen its pressure-retaining capacity. A round, threaded opening 18 is disposed at the proximal end 14b of body 14.

Endplate 16 is a substantially circular steel component having a distal end 16a and a proximal end 16b. Proximal end 16b is threaded to mate with threaded opening 18 of pressure vessel body 14 so that the two are sealably coupled. Endplate 16 may include a hemispherical recess (not shown) that accommodates an O-ring to facilitate fluid-tight sealing. Alternatively, body 14 and endplate 16 may be welded for sealing purposes.

Pressure vessel 12, which is adapted for use as a driver's side airbag inflator, has a longitudinal length of about 7 inches and a diameter of about 1.5 inches. The measured internal volume 12a of pressure vessel 12 is about 9.3 cubic inches for this embodiment. This includes the ignition chamber volume 26a. Measured internal volume as used herein means the volumetric space that is encompassed by the component (here the pressure vessel), and which may be expressed as a mathematical quantity based on measurement (such as water displacement) or calculation. The design depicted in FIG. 1 gives an inflator weight of about 1.2 pounds for this driver's side embodiment. With this design, pressure vessel 12 has structural strength sufficient to reliably contain a fluid pressure inside the pressure vessel of about 15,000 psi. These dimensions and parameters are based on the use of 200,000 psi (200 kpsi) ultimate tensile strength heat-treated steel, and a safety factor for pressure vessel burst of 1.6 times the maximum expected operating pressure. This pressure vessel was designed for use in an airbag inflator system that was adapted to match the performance characteristics (pressure-time performance within the airbag) of a 1994 Buick Skylark driver's side airbag inflator used with a standard 60-liter airbag.

If the device of FIG. 1 were to be designed for use as a passenger side airbag inflator, the preferred dimensions would be about 9 inches in length, 2.4 inches in diameter, and 0.13 inches in body wall thickness. Alternatively, the device in an automotive side impact airbag inflator application preferably would have a length of about 4.5 inches, a diameter of about 1.125 inches, and a body wall thickness of about 0.06 inches. In both the passenger side and the side impact airbag inflator applications, the measured internal volume 12a of pressure vessel 12 preferably would be approximately 25 cubic inches for the passenger side unit, and about 3 cubic inches for the side impact unit. These parameters were determined analytically based on the same method as that described in the previous paragraph. Instead of the 60-liter airbag, however, the passenger side unit used a 180-liter airbag and the side impact unit used a 20-liter airbag. The pressure-time performance was matched to that of the 1994 Buick Skylark driver's side airbag inflator when fired into a 60-liter airbag.

The invention further includes a gas producing source for producing a main gas in the contained volume. This main gas comprises the principal and dominant, if not the sole, component of the working gas. As used in this document, the working gas is the gas or gases that are exhausted from the inflator, e.g., the gas that is exhausted into the airbag. In the embodiment of FIG. 1, the gas producing source comprises a main output charge 20, preferably a propellant as described more fully below, located within pressure vessel 12, i.e., it is loosely contained in pressure vessel 12 and is not further contained in a smaller container or sub-vessel. This has the advantages of simplicity in device design. Other configurations, however, are possible.

The gas producing source should be capable of producing the desired amount of working gas to satisfy the output needs, e.g., the inflation volume requirements, at a selected time, upon the occurrence of selected conditions, or upon demand. Within this broad constraint, the gas producing source may comprise a relatively wide variety of materials, including solids, liquids, and solid-liquid combinations. Solid forms or components may include particulate solids such as powders, granulated solids, pellets, a mixture of granulated solids or pellets, etc. The solid particles, whether powdered, granulated or otherwise, may be substantially pure or they may comprise solid solutions or mixtures.

The process by which such solid particles are produced is not limiting, provided that the proper ratio of burn surface area to burn web (distance of burn) to obtain the desired performance is achieved when used in the airbag inflator. One example of a suitable process would be simple mixing of solid constituent particles. The particles could be tumbled together for a sufficient period of time to achieve the desired level of mixing. Suitable processes also would include pressed or compacted mixtures. An alternative method comprises mixing a thermosetting material with another thermosetting material or a solid material by melting or softening one or both of the thermosetting materials, mixing the resultant composition in this state, and subsequently cooling and solidifying the mixture. Still another method includes mixing a resin or combination of resin and solids and curing the resin into a solid state.

Cocrystallized or coprilled materials may be suitable for the gas producing source in some applications. For example, ammonium nitrate and guanidine nitrate could be crystallized from a water solution in a prilling tower. Solid solutions of mixtures of materials could be formed by comelting the materials, or by some other suitable process. For example, a mixture of ammonium nitrate and tetramethyl ammonium nitrate could be comelted and the melt allowed to solidify after liquification. Regranulating (subsequent granulation of a solid that was previously formed from a mixture or combination of solids) may be desirable in some applications. Liquids may be single- or multi-phase, and may include dissolved solids or gases or both.

There are a variety of application-specific criteria that the gas producing source may be required to meet, depending upon the application. For example, the gas producing source usually must be capable of enduring its storage environments and still be capable of performing reliably when called upon for operation. This includes producing the desired amount of working gas at the required rate for proper inflator operation. The gas producing source also should produce the requisite amount of working gas within the desired time limitations, but without reacting too violently. It is important that the unit exist and operate safely in the presence of people. A gas producing source that could react too quickly or may be detonable would not be tolerable in applications where human safety is an issue.

The selection criteria for the gas producing source may take into account the toxicity not only of the gas producing source itself, but also of the gas produced by it. For example, in the U.S. automotive airbag inflator field, the current practice is to comply with the American Conference of Governmental Hygienists's allowable limits for Short Term Exposure Levels for the Workplace when the gas is discharged into the automobile.

Preferred compositions for the gas producing source comprise a combination of a fuel and an oxidizer. Granulated solid fuel and oxidizer mixtures are particularly preferable, and may comprise granulated mixtures, integrated mixtures, or solid solutions, pelletized solids, or any of the aforementioned methods of manufacture, among others.

Fuels or fuel-based materials that are suitable for use in the gas producing source can be segregated into at least six major categories, including energetic fuels, hydrocarbons, fuels for use in solid solutions with ammonium nitrate, metals, ammonium- or amine-based compounds, and selected nonmetals. These materials may be used singly or in combinations.

Energetic fuels, which are fuels that decompose exothermically, may include, for example, nitro-organics or organic nitrates, e.g., guanidine nitrate, tetramethyl ammonium nitrate, tetraethyl ammonium nitrate, hexahydro-1,3,5-trinitro-1,3,5-triazine (RDX), octahydro-1,3,5,7-tetranitro-1,3,5,7-tetrazine (HMX), nitrocellulose (where it meets the thermal and age stability requirements for the inflator and its application), etc. Other energetic fuels include tetrazole derivatives (e.g., 5-aminotetrazole), hexamethylene tetramine, glycidyl azide polymer (GAP), and cellulose acetate. Preferred energetic fuels would include guanidine nitrate, hexahydro-1,3,5-trinitro-1,3,5-triazine (RDX), tetramethyl ammonium nitrate, and hexamethylene tetramine.

Virtually any hydrocarbon material could potentially be used as a component in the gas producing source. Preferred hydrocarbons would be those which are predominantly solid over the operating temperature range of the system, and those which have a high level of saturation (i.e., mostly single bonds between carbon atoms). The salts of these hydrocarbon fuels also may be suitable. Examples of such hydrocarbons and salts of hydrocarbons would include aluminum stearate, Shellac (principally trihydroxy palmitic acid), hydrocarbon polymers (e.g., polyethylene, polypropylene, polyvinyl derivatives, cured epoxies and epoxy resins, polyesters, polymethyl methacrylate, polyimide derivatives, polybutadiene derivatives, polyurethane derivatives, urea-formaldehyde polymers, GAP, etc.), carboxylic acids (e.g., oxalic acid, malonic acid, succinic acid, citric acid, etc.), and carbohydrates such as cellulose, starch, glucose, dextrin, sucrose, etc.

Examples of fuels for use in solid solutions with ammonium nitrate as a component in the gas producing source include tetramethyl ammonium nitrate, hexamethylene tetramine, dicyandiamide, guanidine nitrate and other guanidine salts, and other urea salts, oxalic acid diamide (oxamid), ammonium formate, ammonium acetate, and ammonium oxalate and other ammonium salts. Guanidine nitrate, hexamethyl tetramine, and tetramethyl ammonium nitrate are preferred from this group. These solid solutions may be made from the fuel/ammonium nitrate system by comelting, coprilling, cocrystallizing, or other appropriate methods.

Many metals are suitable as a fuel component of the gas producing source. The selection or amount of metals, however, may be limited by the requirement generally encountered in automotive airbag inflators to limit the amount of solids in the reaction products, and to limit the amount of nitrous oxides produced as a reaction product when the metal is used in excess amounts. Examples of metals suitable for use include magnesium, aluminum, zirconium, titanium, zinc, and iron.

Ammonium or amine-based compounds suitable for use as components of the gas producing source include ammoniates of salts (e.g., hexammine cobalt II chloride, hexammine cobalt III nitrate, trinitrotetramine cobalt III nitrate, etc.), amines (e.g., oxamid, acetamide, guanidine salts, urea, urea salts, lithium amide, etc.) and ammonium salts (e.g., ammonium formate, ammonium acetate, ammonium oxalate, etc.), and a solid solution of ammonia in ammonium nitrate.

Selected nonmetal materials, other than those previously identified, also may be suitable for use as components of the gas producing source. These include boron, silicon, carbon (e.g., graphite, carbon black, charcoal), boron nitride, boron carbide, etc.

There are many other fuels suitable for use as a component in the gas producing source, such as sodium azide, that may not be desirable for certain automotive airbag applications because of the relatively high solids content and toxicity of their decomposition products, among other reasons.

Solid oxidizers useful as components of the gas producing source include ammonium nitrate, metal chlorates and perchlorates (e.g., potassium perchlorate, sodium perchlorate, lithium perchlorate, etc.), metal nitrates (e.g., potassium nitrate, sodium nitrate, etc.), metal oxides (e.g., manganese dioxide, cupric oxide, ferric oxide, etc.), and metal peroxides (e.g., calcium peroxide, barium peroxide, etc.). Preferred solid oxidizers include ammonium nitrate, metal perchlorates, and manganese dioxide.

The preferred fuel-oxidizer mix is stoichiometric to slightly oxidizer rich, e.g., sufficient to lower carbon monoxide levels in the produced gas, but with a sufficiently low amount of excess oxidizer to provide acceptable concentrations of $NO_2$ and $NO_x$ in the working gas that is exhausted from the system.

The present invention provides a distinct advantage over prior systems in its ability to use burn-resistant materials or, similarly, forced-decomposition materials, as the gas producing source. A forced-decomposition material as referred to here is a material that is not capable of sustaining its own decomposition reaction without the input of additional energy, e.g., from the initiating system or ignition train. Examples of forced-decomposition materials useful for the gas producing source include metal carbonates and oxidizers with insufficient amounts or types of fuel to allow for steady state combustion. These forced-decomposition materials may be used as the gas producing source or as a component in it. The chief advantage of this is that it broadens the selection and availability of materials which can be used as the gas producing source. This provides greater flexibility and an enhanced capability to meet system constraints such as toxicity requirements.

The invention further includes an initiating system for causing conversion of the gas producing source to the main gas. The initiating system should be capable not only of initiating the conversion of the gas producing source to the main gas but, if necessary, sustaining that conversion at least until the desired amount of working gas has been produced.

The initiating system for the embodiment of FIG. 1 comprises an initiator assembly or an initiator 22 of known design, such as initiator assembly Part No. 4516840, available from OEA Inc. of Aurora, Colo., an ignition charge 24 contained within an ignition chamber 26, a pair of electrical leads or pins 28 (which may be included with initiator 22), and an ignition chamber closure 30. Electrical leads 28 are connected to a deployment switch or actuator (not shown). When an electrical signal is applied to leads 28, the initiator assembly emits thermal energy sufficient to ignite ignition charge 24 and thereby initiate a combustion reaction of ignition charge 24 in ignition chamber 26.

Preferably, ignition chamber 26 is sized so that its measured internal volume 26a is at least about 5%, and more preferably at least about 10%, of the measured internal volume 12a of the contained volume. For example, a pressure vessel volume of 8 cubic inches would call for an ignition chamber volume of at least about 0.4 cubic inches and more preferably at least about 0.8 cubic inches. The ignition chamber in the embodiment of FIG. 1 has a measured internal volume 26a of 0.8 cubic inches.

One can determine the appropriate type and amount of ignition charge 24 in the following manner. A given ignition charge has associated with it an ignition charge energy per unit of mass. A fixed amount of ignition charge energy therefore can be determined from a given ignition charge composition and amount. Similarly, a given gas producing source has a charge energy per unit of mass associated with it. The gas producing source charge energy usually is determined based on the selection of the desired gas producing source, and on the total volume of working gas to be produced. Given this, the ignition charge composition and amount preferably are selected so that the ignition charge energy is at least about 10% of the gas producing source charge energy, and more preferably about 10% to 20%. This allows for use of very burn-resistant or difficult to ignite gas producing source materials, such as forced decomposition materials, which advantageously are less susceptible to detonation or excessively-energetic combustion.

The following examples provide illustrative compositions and amounts for the ignition charge and main output charge (gas producing source) for use in the embodiment of FIG. 1. All percentages are mass percentages and all references to parts are based on mass. All references to particle size refer to average particle size.

EXAMPLE 1

In this first example, the ignition charge and the main output charge had the same composition. The material was prepared as follows. About 9.5 grams of a 60-micron ammonium nitrate mixture was prepared by mixing 98.5 parts of ammonium nitrate with 1.5 parts diotomacious earth (which is used as an anti-caking agent). About 9.5 grams of Bullseye smokeless powder, manufactured by Hercules Inc. of Kenville, N.J., was added to the ammonium nitrate mixture. The resultant combination was mechanically mixed to provide a uniform mixture of the ingredients having total mass of about 19.0 grams. About 2.0 grams of the material were used as ignition charge, and about 17.0 grams of material were used directly in pressure vessel 12 for the main output charge (the gas producing source).

EXAMPLE 2

An ignition charge having a total mass of about 2.0 grams and a main output charge having a total mass of about 19.5 grams were prepared as follows. About 11.4 grams of the 60-micron ammonium nitrate mixture as described in Example 1, above, were prepared for use in both the ignition charge and the main output charge.

The ignition charge was prepared by adding about 1.2 grams (59.4% of the 2.0-gram total) of the ammonium nitrate mixture to about 0.8 grams (40.6% of the 2.0-gram total) of 150-micron hexahydro-1,3,5-trinitro-1,3,5-triazine (RDX). The resultant combination was mechanically mixed to provide a uniform mixture of the ingredients.

The main output charge for placement in pressure vessel 12 was prepared by combining about 9.3 grams (47.7% of the 19.5-gram total) of the same 150-micron hexahydro-1, 3,5-trinitro-1,3,5-triazine (RDX) to about 10.2 grams (52.3% of the 19.5 gram total) of the ammonium nitrate mixture, and mechanically mixing the resultant combination to obtain a uniform mixture of the ingredients.

Ignition chamber closure 30, preferably a burst disk blocking a circular orifice roughly the diameter of the ignition chamber itself, ruptures when the pressure within the ignition chamber reaches a selected level. In the embodiment of FIG. 1, that pressure is designed to be about 10,000 psi. The opening of closure 30 allows ignition charge 24 and its reaction products (including heat), collectively referred to as the ignition materials, to exit ignition chamber 26 and enter the main volume of pressure vessel 12. This causes the hot particles and gases of the ignition materials and the corresponding thermal energy to mix with and intimately contact the gas producing source material in pressure vessel 12, as explained more fully below.

It should be noted that alternative designs for the initiating system are within the scope of the invention. For example, and not by way of limitation, a controlling nozzle may be used in place of, or coupled with, a closure such as closure 30 to control the flow of ignition materials into the pressure vessel or other contiguous chamber.

The invention further includes at least one exhaust orifice for providing an exhaust path for the working gas from the contained volume, and for controlling the flow rate of the working gas as it is exhausted from the contained volume. The at least one exhaust orifice includes at least one contained volume closure for selectively creating a fluid-tight seal in the contained volume.

Referring to the preferred embodiment of FIG. 1, the at least one exhaust orifice comprises a pair of output control orifices 32, each of about 0.070 inches diameter, disposed 180 degrees apart in pressure vessel body 14. The contained volume closure comprises a corresponding plurality of burst disks 34. Ignoring the burst disks for the moment, output control orifices 32 are in fluid communication with the interior volume 12a of pressure vessel 12 and with the interior volume of the airbag (not shown). Orifices 32, when unrestricted by burst disks 34, provide channels or paths for the escape of pressurized working gas from pressure vessel 12 to the airbag to fill the latter.

Burst disks 34 are pressure-sensitive, and are designed to rupture when the internal pressure in pressure vessel 12 reaches a predefined level, e.g., about 7,000 psi. When inflator 10 is in its pre-deployed state and prior to the rupturing of burst disks 34, the burst disks provide a fluid-tight seal over output control orifices 32. As the main gas is produced by the gas producing source, it is temporarily contained within pressure vessel 12. When the pressure in pressure vessel 12 reaches the actuation pressure of burst disks 34, the disks rupture to allow the working gas within pressure vessel 12 to exit through output control orifices 32 to the airbag.

The designs of the output control orifices and contained volume closure are not limited to those shown and described above. For example, the number and sizing of the control orifices could vary, depending upon the desired working gas flow rate and flow regime. The contained volume closure design could range from high-pressure burst disks to environmental seals that rupture at a relatively low pressure. The closure design may be influenced by the specific gas producing source materials used, their reaction characteristics, toxicity requirements, ignition energy requirements, etc.

The operation of the FIG. 1 embodiment, which illustrates a presently preferred method according to the invention, will now be described. Prior to deployment, airbag inflator 10 is as shown in FIG. 1. Main output charge 20 (the gas producing source) is pre-stored in pressure vessel 12, ignition charge 24 is pre-stored in ignition chamber 26, and electrical leads 28 are electrically connected to the actuating mechanism of the vehicle (not shown). Pressure vessel 12 in its predeployed state contains an initial gas which preferably is at substantially atmospheric pressure (about one atmosphere absolute). The pressure within ignition chamber 26 also is substantially atmospheric. Although high pressures do not exist in the pressure vessel during storage and the gas producing source is substantially entirely liquid or solid, pressures of up to about 10% of the peak operating pressure ($P_{peak}$) may exist in the pressure vessel during storage to retain liquid gas producing sources in a liquid state. An example would be a solution of ammonium nitrate in ammonia. In the embodiment of FIG. 1, this stored or initial pressure may be up to several hundred psi, but preferably is at about one atmosphere absolute.

The same relationship holds for the corresponding pressure-volume quantities in the contained volume (discussed more fully below). The initial gas has associated with it an initial pressure-volume quantity ($PV_{cv}(t_o)$) prior to the conversion of the gas producing source to the main gas. The initial pressure-volume quantity for this initial gas preferably is less than about 10% of the peak pressure-volume quantity ($PV_{peak}$).

Upon collision of the vehicle with an object, the actuating mechanism produces an electrical signal on leads 28, which causes ignition charge 24 to be ignited. For ease of illustration, this will be referred to as time $t_o$. As ignition charge 24 undergoes reaction in ignition chamber 26, the ignition charge produces an ignition gas and heat, which causes the pressure in the ignition chamber to increase until the critical pressure of closure 30 is achieved. At this point the closure ruptures. This rupturing of ignition chamber closure 30, which occurs about 0.5 to 5.0 milliseconds after $t_o$, causes the ignition materials to be blown into pressure vessel 12, where they intimately mix with and contact the particles of main output charge 20 (the gas producing source). This contact with the hot ignition materials initiates the conversion of main output charge 20 to the main gas. As this occurs, the pressure in pressure vessel 12 quickly rises.

The concept of pressure-volume quantities has importance in understanding and appreciating the significance of the invention. In thermodynamic terms, any contained gas has associated with it a pressure-volume ("PV") quantity. Mathematically, this PV quantity is equal to the pressure of the gas multiplied by the volume that it occupies. This volume includes the total internal volume within the inflator, which in this embodiment corresponds to pressure vessel internal volume 12a (which includes ignition chamber internal volume 26a). Thermodynamically, the PV quantity corresponds to the mechanical energy of the contained gas. A given amount of gas producing source material can be converted into a definite quantity of main gas.

The working gas, which is the gas or gases that are exhausted from the inflator, e.g., to fill the airbag, comprises primarily the main gas produced from the gas producing source. The initial gas, if any, present in the contained volume and the ignition gas also are included in the working gas.

It should be noted that the pressures and PV quantities associated with various production units of inflator 10 will vary somewhat from unit to unit. This is attributable to the statistical nature of the devices and the underlying phenomena. It is impossible to predict or determine in advance exactly how much pressure will be created from a given ignition charge or main output charge. Accordingly, statistical distributions, most notably the normal distribution, are used to describe the performance. As is commonly understood, the parameters of the distribution, particularly the average or mean of the distribution, are used. Therefore, reference to pressures and pressure-volume quantities refer to their mean unless otherwise indicated.

Thus, the gas producing source can be selected, both as to composition and amount, to produce a desired total PV quantity ($PV_{total}$) of working gas when the gas producing source has been fully converted to the main gas. It should be noted that the term fully converted as used in this document refers to the completion of the chemical conversion reaction in converting the gas producing source to the main gas in the specific environment in which the device operates. This rarely corresponds to 100% conversion of reactant to product. Rather, it refers to the extent of chemical conversion, (the amount of reactant that has been converted to reaction product), given appropriate thermodynamic and kinetic considerations, in which all of the reactant has been converted that is to be converted under the existing conditions. The actual extent of conversion can depend upon a number of factors, depending upon the specifics of the system. For example, conversion in solid particle systems may depend upon the specific gas producing source materials and components used, their particle sizes, their surface areas and porosities, the extent of mixing, heat transfer and the associated heat losses from the system, and the change in Gibbs free energy associated with the various reactions taking place in the system, which in turn depend on the reaction temperatures and pressures, and the enthalpies and entropies. Chemical kinetic factors may include mass and energy diffusion rates, the existence and extent of ash layers on the particles as they react, and the sensitivity of reaction rate to temperature and pressure. Kinetics also will be influenced by the ignition energy applied and the pressure in the system. The chemical conversion varies with time, the PV quantity also varies as a function of time (PV(t)), monotonically increasing with time in virtually all cases.

The total PV quantity for a given system is selected based on the amount of working gas required for the application. The total PV quantity ($PV_{total}$) for the FIG. 1 embodiment, for example, is about 80 psi-ft$^3$ to 120 psi-ft$^3$. The total PV quantity for a passenger side inflator, using a 180-liter airbag and matching the pressure-time performance within the bag to that of the standard 1994 Buick Skylark driver's side airbag system when deployed, is about 280 psi-ft$^3$ to 420 psi-ft$^3$. These quantities were determined according to the procedures described above for sizing the pressure vessels. The total PV quantity for a side impact airbag inflator sized in the same way but using a 20-liter airbag would be about 30 to 45 psi-ft$^3$. Each of these ranges depends upon the specific design parameters and test methods. These ranges are based on a test method in which the unit was operated with the output control orifices plugged so that no gas could escape from the pressure vessel. The total pressure $P_{total}$ within pressure vessel 12 (the peak pressure under these test conditions, and before the pressure declines due to heat loss) was measured, and this was multiplied by the measured internal volume 12a of the pressure vessel which includes ignition chamber internal volume 26a. This pressure-volume product corresponds to the total pressure-volume quantity ($PV_{total}$).

Incidentally, it should be noted that the magnitude of the total pressure $P_{total}$ in the pressure vessel can be used in some applications to size the pressure vessel. For example, in the vehicle airbag inflator application depicted in FIG. 1 and others as well, the ratio of the total PV quantity to the measured internal volume 12a of the contained volume is at least 12,000 psi. The preferred range for this ratio is about 12,000 psi to about 40,000 psi. The lower pressure corresponds to the largest practicable size which may be used for practical vehicle airbag inflators, and the higher pressure corresponds to the highest practicable pressure for which the unit can be designed given present materials and technology.

FIG. 2 graphically illustrates PV quantities as a function of time for the deployment operation of the FIG. 1 embodiment. The x axis represents time and the y axis represents PV quantities. The origin corresponds to time $t_o$ and zero PV quantity. Three curves are shown in the graph. The curve $PV_{cv}(t)$ represents the PV quantity as a function of time for working gas in the contained volume. This curve begins at the initial PV quantity in the pressure vessel at time $t_o$ immediately prior to activation, $PV_{cv}(t_o)$. For this embodiment, $PV_{cv}(t_o)=0$ psig-ft$^3$ because air at atmospheric pressure (0 psig) is in pressure vessel 12 during its pre-stored and pre-deployed state. More generally, however, prior to the conversion of the gas producing source to the main gas, the internal pressure of the contained volume is about one atmosphere, and the PV quantity for initial gas stored within the contained volume is less than about 10% of the peak PV quantity, $PV_{peak}$.

The curve $PV_{cum}(t)$ represents the cumulative PV quantity as a function of time for the initial gas plus any other gas that has been produced and is or was available to be discharged from inflator 10. This includes the initial gas if any, the ignition gas if any, and the main gas to the extent it has been converted from the gas producing source. In other words, $PV_{cum}(t)$ represents the total working gas available, whether it is in the contained volume or it has been exhausted from the contained volume. This curve begins at $PV_{cum}(t_o) = PV_{cv}(t_o)=0$ psig-ft$^3$ because no gas has been produced at time $t_o$. The curve $PV_{exhaust}(t)$ represents the PV quantity as a function of time for the gas (working gas) that has been exhausted from pressure vessel 12 through output control orifices 32. Given these definitions, it is clear that:

$$PV_{cum}(t)=PV_{cv}(t)+PV_{exhaust}(t)$$

At time $t_o$, the pressure in pressure vessel 12 is steady at the initial level of one atmosphere (0 psig). As ignition chamber closure 30 ruptures and the conversion of main output charge 20 to main gas begins, the pressure in pressure vessel 12 begins to rapidly rise, as does the corresponding PV quantity $PV_{cv}(t)$. This pressure and the PV quantity $PV_{cv}(t)$ reach peaks $P_{peak}$ and $PV_{peak}$, respectively, at time $t_{peak}$.

In accordance with the invention, $PV_{peak}$ is at least about one half of $PV_{total}$, and preferably one half of $PV_{total}$ or greater. This helps to ensure that the gas generation from the inflator will be dominated by blowdown or flow rate effects, and not by chemical reaction rates. More specifically, in systems with minimal heat loss, ensuring that the system is configured so that $PV_{peak}$ is at least one half of $PV_{total}$ dictates that the rate of gas flow from the system is predominantly controlled by blowdown. Blowdown refers to the phenomenon of a gas discharging from a vessel through an orifice where the vessel has been pressurized with all of the gases to be discharged prior to the release of the gas from the vessel. Peak PV quantities ($PV_{peak}$) of slightly less than one half of $PV_{total}$ may be acceptable, for example, to compensate for heat losses from the gas. Although pure blowdown does not necessarily or even preferably occur here, the features and flow parameters of the present system largely follow the characteristics of a blowdown system. This is advantageous in that the rate at which working gas is exhausted from the system will be far less dependant upon the decomposition rate of the gas producing source than it is in many known systems. This also reduces the variation in working gas flow rate from the airbag inflator over the operating temperature range. Another advantage is that the generation of gas on demand eliminates the need to contain pressurized gas over the storage life of the inflator.

Returning to the embodiment of FIG. 1, pressure vessel burst disks 34 preferably open exactly at $P_{peak}$. Given the statistical nature of the burst disk operation, however, the mean of the pressure at which burst disks 34 rupture must be selected so that the disks rupture at the appropriate time within defined limits. To explain, burst disk 34 ideally would rupture precisely at the peak pressure $P_{peak}$. The purpose of this is to minimize the toxicity of the exhausted working gases, as well as to optimize the reaction conversion of the gas producing source to the main gas. By providing relatively greater time for chemical conversion prior to release of the working gases, it is possible to minimize or greatly reduce the concentration of unwanted products of intermediate reactions. In systems including a fuel and oxidizer, for example, it is possible to obtain more complete conversion of the oxidizer. For hydrocarbon systems, the concentrations of carbon monoxide and unspent or incompletely reacted hydrocarbons can be reduced in favor of greater carbon dioxide concentrations. When nitrate-based oxidizers are used, it may be possible to minimize or reduce NO, $NO_2$ and $NO_x$ levels. The exact pressure at which a burst disk such as disks 34 ruptures, however, varies from disk to disk, and depends upon the specific conditions present. Therefore, the response of the burst disks typically is expressed in statistical terms. That is, based on tests of large numbers of such disks, a statistical distribution is used that fairly represents the behavior of the disks. The distribution used most often is a normal distribution, which has as parameters a mean and a standard deviation or variance. Because it is not possible to have a burst disk accurately and reliably open precisely at a designated pressure or corresponding PV quantity, it is common to specify the range of pressures at which the burst disk ruptures in terms of a range about the mean pressure at which the disks burst. This range establishes the minimum and maximum pressures between which the disks consistently rupture with a given confidence level or reliability. Because it is not possible for burst disks 34 to open exactly at $P_{peak}$ on a consistent basis, the disks preferably have a mean rupture pressure that is selected so that the disks rupture when the pressure within pressure vessel 12 is as close to $P_{peak}$ as practicable and still rupture within the required reliability allotment for the specific application or design. Preferably, the mean burst pressure of the disks is about 50% to 75% of the total pressure $P_{total}$ that would be achieved if the inflator were deployed with orifices 32 closed or blocked.

Upon the rupturing of burst disks 34, the working gas contained in pressure vessel 12 begins to escape through output control orifices 32. As this occurs, the PV quantity for the working gas still in pressure vessel 12 ($PV_{cv}t$)) reaches $PV_{peak}$ and then begins to decrease. The PV quantity of the exhausted working gas $PV_{exhaust}(t)$ correspondingly begins to increase after the rupture of burst disks 34. The PV quantity $PV_{cv}(t)$ continues to decrease as the working gases are exhausted from pressure vessel 12 until main gas no longer is being produced by main output charge 20 and the pressure inside pressure vessel 12 reaches equilibrium with the pressure at output control orifices 32, i.e., when the internal pressure of pressure vessel 12 reaches equilibrium with the pressure within the airbag. Correspondingly, the PV quantity of the exhausted working gas $PV_{exhaust}(t)$ continues to increase until it reaches approximately $PV_{total}$.

The preferred embodiment is particularly useful for vehicle airbag inflator applications in which the airbag must be fully inflated within about 20 to 100 milliseconds. For systems according to the invention that operate in this application and regime, a desirable design objective is to have 90% of the working gas exhausted from the contained volume of the inflator within this time range. To explain, the amount of the working gas exhausted from the contained volume corresponds to an exhaust pressure-volume quantity $PV_{exhaust}(t)$. Similarly, the total amount of the working gas exhausted from the contained volume corresponds to a total exhausted pressure-volume quantity $PV_{exhaust}(t_{final})$. This PV quantity is equal to $PV_{total}$ for the ideal case in which there are no heat losses from the system. The quantity $PV_{exhaust}(t_{final})$ is somewhat less than $PV_{total}$ for cases in which there is heat loss. When dealing with certain vehicle airbag inflators, it is advantageous to exhaust the working gas from the contained volume at a sufficient rate so that $PV_{exhaust}(t)$ reaches 90% of $PV_{exhaust}(t_{final})$ more than 20 milliseconds after time $t_o$.

A vehicle airbag inflator 110 according to a second preferred embodiment of the invention is depicted in FIG. 3. This embodiment is similar to that of FIG. 1 and operates in like manner, but it differs in that it further includes a combustion chamber 136 for containing the gas producing source and for pre-combusting a portion of the gas producing source prior to releasing the gas producing source from the combustion chamber.

Airbag inflator 110 includes a pressure vessel 112 similar to pressure vessel 12 as described above for inflator 10. Pressure vessel 112 includes a pressure vessel body 114 and an endplate 116 that are threadably mated to sealably contain the pressure vessel internal volume 112a. The internal volume of pressure vessel 112, incidentally, is about 9.3 cubic inches, including the internal volume 126a of the ignition chamber and the internal volume of the combustion chamber disposed within the pressure vessel.

An initiating system is disposed in endplate 116, as described above. This initiating system includes an initiator 122, an ignition charge 124, an ignition chamber 126, and an ignition chamber closure 130 blocking a circular orifice roughly the diameter of the ignition chamber itself, as explained for the embodiment of FIG. 1. Ignition chamber internal volume 126a is about 0.8 cubic inches.

Combustion chamber 136 is disposed within pressure vessel 112 for containing the gas producing source, which in this embodiment is main output charge 120. Combustion chamber 136 rigidly extends from endplate 116 into pressure vessel 112. It has a measured internal volume 136a of about 2.5 cubic inches. Combustion chamber 136 includes a combustion chamber closure 138, here a burst disk, that opens to release main output charge 120 from combustion chamber 136 to pressure vessel 112 when the pressure within the combustion chamber reaches a predetermined level as necessary to achieve proper conversion of main output charge 120 to the main gas, e.g., of about 10,000 psi in this embodiment.

The airbag inflator of FIG. 3 is inherently designed to achieve a certain level of particulate filtering. This is accomplished in part by the following structural features. Pressure vessel 112 includes a wall structure 140 adjacent to output control orifices 132, and combustion chamber 136 includes wall structure 142 adjacent to but spaced from output control orifices 132 to filter particulate matter from the gas as it exits through the orifices. Output control orifices 132 are disposed 180 degrees apart and have a diameter of about 0.070 inches. This enables the system to filter and separate solid particles from the gas stream, for example, in the following manner. Some solid and particulate matter will be suspended in the gases in pressure vessel 110. As the gases are exhausted from the pressure vessel, a flow occurs along the interior wall of pressure vessel 110 approaching orifices 132. When the gases are at or very near orifices 132, the flow path generally curves toward and out of the orifices. This requires the entrained particles to undergo a centrifical acceleration toward the orifices. Some of the particles, depending upon their size, density, and relative position, are unable to accelerate sufficiently to exit the orifices. These larger or heavier particles then pass the orifices and move to the end of pressure vessel nearest endplate 116. In essence, therefore, this configuration functions as a tortuous path filter or a solid-gas separator.

The following examples provide illustrative compositions and amounts for the ignition charge and gas producing source for use in the embodiment of FIG. 3. All percentages are based on mass.

EXAMPLE 3

About 15.1 grams of a 60-micron ammonium nitrate mixture as described in Example 1, above, was prepared for use in the ignition charge and in the main output charge.

An ignition charge having a total mass of about 2.0 grams was prepared in the following manner. About 1.2 grams (59.4% of the 2.0-gram total) of the 60-micron ammonium nitrate mixture was mixed with about 0.8 grams (40.6% of the 2.0-gram total) of 150 micron hexahydro-1,3,5-trinitro-1,3,5-triazine (RDX). The resultant combination was mechanically mixed to provide a uniform mixture of the ingredients.

A main output charge having a total mass of about 25.0 grams was prepared for placement in the combustion chamber by combining the following three components: (1) about 13.9 grams (55.6% of the 25.0-gram total) of the same ammonium nitrate mixture as that used for the ignition charge of this example, (2) about 3.8 grams (15.0% of the 25.0-gram total) of the same 150-micron hexahydro-1,3,5-trinitro-1,3,5-triazine (RDX) as that used for the ignition charge of this example, and (3) about 7.3 grams (29.4% of the 25.0-gram total) of 60-micron guanidine nitrate. The resultant mixture was mechanically mixed to obtain a uniform mixture of the ingredients. No charge was placed directly into the pressure vessel.

EXAMPLE 4

Approximately 9.3 grams of the 60-micron ammonium nitrate mixture as described in Example 1, above, was prepared for use in the ignition charge and in the main output charge.

An ignition charge having a total mass of about 2.0 grams was prepared as follows. About 1.2 grams (59.4% of the 2.0-gram total) of the 60-micron ammonium nitrate mixture was mixed with about 0.8 grams (40.6% of the 2.0-gram total) of 150-micron hexahydro-1,3,5-trinitro-1,3,5-triazine (RDX). The resultant combination was mechanically mixed to provide a uniform mixture of the ingredients.

The main output charge, comprising a total mass of about 21.0 grams, was prepared for placement in the combustion chamber by combining the following four components: (1) about 8.1 grams (38.4% of the 21.0-gram total) of the same ammonium nitrate mixture as that used for the ignition charge of this example, (2) about 3.2 grams (15.0% of the 21.0-gram total) of the same 150 micron hexahydro-1,3,5-trinitro-1,3,5-triazine (RDX) as that used for the ignition charge of this example, (3) about 7.4 grams (35.7% of the 21.0-gram total) of 60-micron guanidine nitrate, and (4) about 2.3 grams (10.9% of the 21.0-gram total) of 60-micron potassium perchlorate. The resultant combination was mechanically mixed to obtain a uniform mixture of the ingredients. No charge was placed directly into the pressure vessel.

EXAMPLE 5

An ignition charge having a total mass of about 2.0 grams was prepared as follows. About 1.2 grams (59.4% of the 2.0-gram total) of the 60-micron ammonium nitrate mixture as described in Example 1, above, was prepared. This ammonium nitrate mixture was mixed with about 0.8 grams (40.6% of the 2.0-gram total) of 150-micron hexahydro-1,3,5-trinitro-1,3,5-triazine (RDX). The resultant combination was mechanically mixed to provide a uniform mixture of the ingredients.

A main output charge having total mass of about 22.0 grams was prepared for placement in the combustion chamber by combining the following three components: (1) about 3.3 grams (15.0% of the 22.0-gram total) of the same 150-micron hexahydro-1,3,5-trinitro-1,3,5-triazine (RDX) as that used for the ignition charge of this example, (2) about 10.3 grams (46.9% of the 22.0-gram total) of 60-micron guanidine nitrate, and (3) about 8.4 grams (38.1% of the 22.0-gram total) of 60-micron potassium perchlorate. The resultant combination was mechanically mixed to obtain a uniform mixture of the ingredients. No charge was placed directly into the pressure vessel.

The method of operation for the airbag inflator of FIG. 3 is much the same as that of the FIG. 1 embodiment. During storage prior to operation, inflator 110 is as shown in FIG. 3. Main output charge 120 is pre-stored in combustion chamber 136 rather than being stored directly in pressure vessel 112. Ignition charge 124 is pre-stored in ignition chamber 126, and electrical leads 128 are electrically connected to the actuating mechanism of the vehicle (not shown). The initial pressure within both combustion chamber 136 and pressure vessel 112 is substantially atmospheric.

Upon impact with another vehicle, the actuating mechanism produces an electrical signal on leads 128 which causes initiator 122 to ignite ignition charge 124 at time $t_o$. The building pressure within ignition chamber 126 produced by the combustion of ignition charge 124 causes closure 130 to rupture at time $t_{peak}$. This in turn causes the ignition materials and the corresponding thermal energy to be blown into combustion chamber 136, which intimately mixes with main output charge 120 (the gas producing source) in combustion chamber 136 and causes the conversion of main output charge 120 to the main gas. As this reaction occurs, the pressure in combustion chamber 136 builds until the burst pressure of combustion chamber closure 138 is reached and closure 138 opens to blow the working gas and the as-yet unconverted main output charge into pressure vessel 112.

The PV quantities for this embodiment correspond to those shown in FIG. 2 in the sense that they generally have the same shapes and relative magnitudes. The total internal volume for purposes of determining PV quantities is measured internal volume 112a of pressure vessel 112 including that of pressure vessel 112 itself, combustion chamber 136 and ignition chamber 126.

The principal advantages of the design depicted in FIG. 3 are that the combustion chamber improves the ease of conversion of the gas producing source to the main gas and potentially improves the performance of the unit. Combustion chamber 136 provides the advantage of a smaller volume for initial reaction of the gas producing source with the ignition materials. This allows for relatively greater ignition temperatures and pressures, and it facilitates heat transfer, which improve reaction rates. The chemical kinetics thereby can be enhanced and conversion can be improved. These advantages are offset to some extent, however, by the added weight, complexity and cost of the device relative to the design shown in FIG. 1.

Figure 4A:
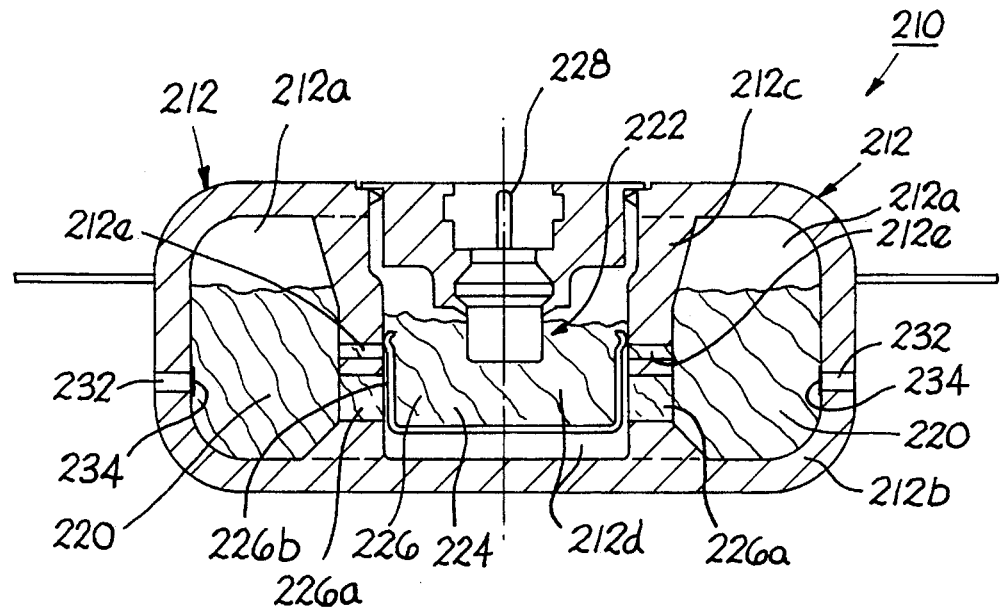
FIG. 4A is a side cutaway view of a third preferred embodiment of the invention.
Figure 4B:
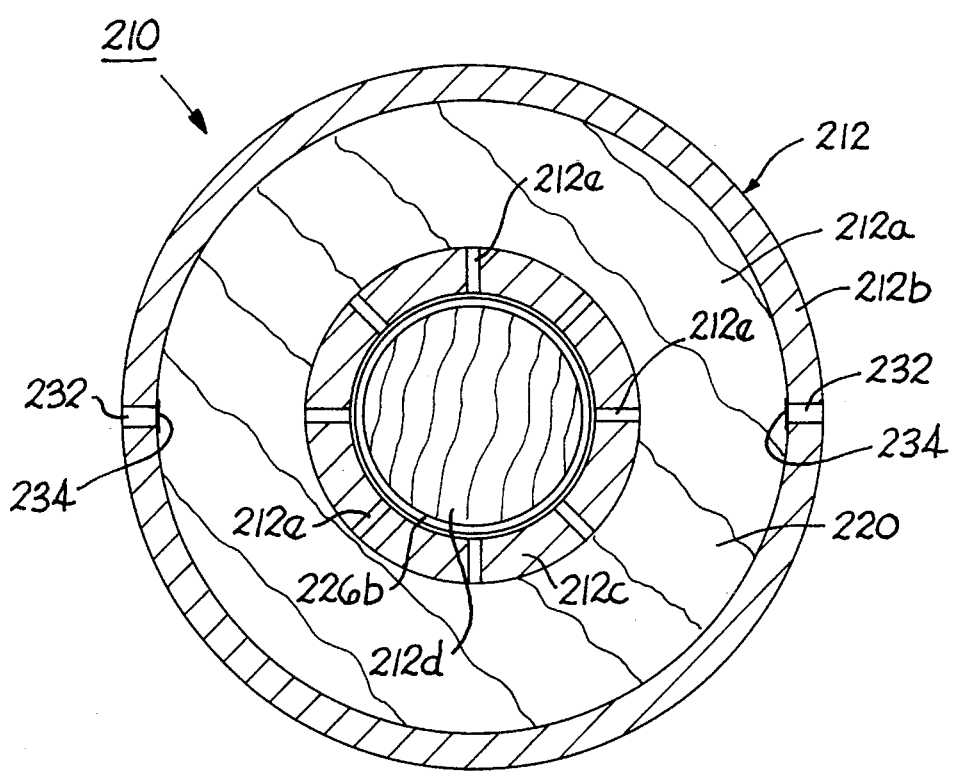
FIG. 4B is a top view of the third preferred embodiment of the invention depicted in FIG. 4A.

A vehicle airbag inflator 210 according to a third preferred embodiment of the invention is depicted in FIGS. 4A and 4B. In this embodiment, which is useful as a driver's side airbag inflator, the contained volume comprises a pressure vessel 212 having a substantially toroidal shape. Pressure vessel 212 includes an outer wall structure 212b and an inner wall 212c which, together with a contained volume closure as described below, provide a sealed internal volume 212a of about 6.0 cubic inches, including the ignition chamber volume. A central region 212d is formed within the interior of inner wall 212c. Eight orifices 212e having diameter of about 0.063 inches are disposed approximately one half of the distance between the bottom inside surface and the top inside surface of pressure vessel 212. The longitudinal axis of each orifice is oriented along the radius of the center of the toroidal pressure vessel in the plane depicted in FIG. 4B and spaced 45 degrees apart from each adjacent orifice. This positioning of orifices 212e facilitates mixing of ignition materials, as will be explained in greater detail below.

The gas producing source in the form of a main output charge 220 is disposed within internal volume 212a of pressure vessel 212. The main output charge may comprise any of the aforementioned gas producing source materials.

The initiating system for this embodiment comprises an ignition chamber 226 having a substantially cylindrical shape disposed within central region 212d. The internal volume of ignition chamber 226 is about 0.6 cubic inches. An initiator 222 coupled to a pair of electrical leads 228 is positioned with its output within ignition chamber 226.

It is necessary to have some practical manner to place main output charge 220 in pressure vessel 212 during manufacture of the device. Accordingly, a fill port 226a is disposed in pressure vessel wall 212c for this purpose. A movable ignition charge cup 226b is positioned on and contiguous with inner wall 212c within ignition chamber 226 so that it is movable along inner wall 212c. Ignition charge cup 226b has two 360-degree flanges formed around its circumference, one at each end of its cylindrical length. These flanges contact the inner wall of ignition chamber 226 and are in compression when ignition charge cup 226b is installed. The flanges act as a compression seal between ignition charge cup 226b and the ignition chamber wall. This prevents main output charge 220 from migrating into ignition chamber 226 during storage. Additionally, this seal prevents the output from initiator 222 from exhausting through the eight orifices 212e after initiator 222 is actuated, but prior to the beginning of the conversion reaction of ignition charge 224, as described below. During manufacture of inflator 210, the ignition charge cup initially is not installed. After main output charge 220 has been placed in the pressure vessel main volume, ignition charge cup 226b is installed downwardly so that its walls cover fill port 226a and orifices 212e.

An ignition charge 224 is disposed within ignition chamber 226. A pair of output control orifices 232 are disposed on opposite sides of outer pressure vessel wall 212b. These orifices have a diameter of about 0.075 inches. This embodiment includes a contained volume closure in the form of a pair of pressure vessel burst disks 234 that have a mean burst pressure of about 10,000 psi. An airbag (not shown) is in fluid communication with output control orifices 232 so that, when burst disks 234 rupture, working gas in pressure vessel 212 flows into the airbag.

The following examples provide illustrative compositions and amounts for the ignition charge and gas producing source for use in the embodiment of FIGS. 4A and 4B. All percentages are mass percentages.

EXAMPLE 6

An ignition charge having a total mass of about 2.4 grams was prepared as follows. About 1.4 grams (59.4% of the 2.4-gram total) of the 60-micron ammonium nitrate mixture as described in Example 1, above, was prepared. This ammonium nitrate mixture was mixed with about 1.0 grams (40.6% of the 2.4-gram total) of 150-micron hexahydro-1, 3,5-trinitro-1,3,5-triazine (RDX). The resultant combination was mechanically mixed to provide a uniform mixture of the ingredients.

A main output charge having total mass of about 16.5 grams was prepared for placement directly in pressure vessel 212 by combining the following three components: (1) about 2.5 grams (15.0% of the 16.5-gram total) of the same 150-micron hexahydro-1,3,5-trinitro-1,3,5-triazine (RDX) as that used for the ignition charge of this example, (2) about 4.8 grams (29.4% of the 16.5-gram total) of 60-micron guanidine nitrate, and (3) about 9.2 grams (55.6% of the 16.5-gram total) of the 60-micron ammonium nitrate mixture as described in Example 1, above. The resultant combination was mechanically mixed to obtain a uniform mixture of the ingredients.

EXAMPLE 7

An ignition charge having a total mass of about 2.4 grams was prepared in the same manner as the ignition charge in Example 6, above. A main output charge having total mass of about 18.5 grams was prepared for placement directly in pressure vessel 212 by combining the following three components: (1) about 2.8 grams (15.0% of the 18.5-gram total) of the same 150-micron hexahydro-1,3,5-trinitro-1,3,5-triazine (RDX) as that used for the ignition charge of this example, (2) about 8.3 grams (45.0% of the 18.5-gram total) of 60-micron guanidine nitrate, and (3) about 7.4 grams (40.0% of the 18.5-gram total) of 60-micron potassium perchlorate. The resultant combination was mechanically mixed to obtain a uniform mixture of the ingredients.

EXAMPLE 8

An ignition charge having a total mass of about 2.4 grams was prepared as follows. About 1.4 grams (59.4% of the 2.4-gram total) of the 60-micron ammonium nitrate mixture as described in Example 1, above, was prepared. This ammonium nitrate mixture was mixed with about 1.0 grams (40.6% of the 2.4-gram total) of 150-micron hexahydro-1, 3,5-trinitro-1,3,5-triazine (RDX). The resultant combination was mechanically mixed to provide a uniform mixture of the ingredients.

A main output charge having total mass of about 16.5 grams was prepared for placement directly in pressure vessel 212 by combining guanidine nitrate and ammonium nitrate prepared as follows. About 7.1 grams (43.3% of the 16.5-gram total) of guanidine nitrate was combined with about 9.4 grams (56.7% of the 16.5-gram total) of ammonium nitrate were crystallized together from an aqueous solution and processed to a mean particle size of about 200 microns. This could be done, for example, in a high-volume manufacturing process by prilling the two ingredients in a prilling tower from a hot aqueous solution that includes the two components in appropriate ratios.

EXAMPLE 9

In this example, the ignition charge comprises ammonium nitrate and hexahydro-1,3,5-trinitro-1,3,5-triazine (RDX). As a matter of reference in all of these examples, it is clear that the ignition charge has an ignition charge mass, and that the main output charge has a main output charge mass. In this example, the ammonium nitrate comprises about 60% of the ignition charge mass, and the hexahydro-1,3,5-trinitro-1,3,5-triazine (RDX) comprises about 40% of the ignition charge mass. The main output charge in this example comprises ammonium nitrate and guanidine nitrate. The main output charge has a main output charge mass that is about five to ten times the ignition charge mass. The ammonium nitrate in the main output charge comprises about 60% of the main output charge mass, and the guanidine nitrate comprises about 40% of the main output charge mass.

More specifically, in this example, about 10.8 grams of a 60-micron ammonium nitrate mixture as described in Example 1, above, was prepared for use in the ignition charge and in the main output charge.

An ignition charge having a total mass of about 2.4 grams was prepared in the following manner. About 1.4 grams (59.4% of the 2.4-gram total) of the 60-micron ammonium nitrate mixture was mixed with about 1.0 grams (40.6% of the 2.4-gram total) of 150-micron hexahydro-1,3,5-trinitro-1,3,5-triazine (RDX). The resultant combination was mechanically mixed to provide a uniform mixture of the ingredients.

A main output charge having a total mass of about 16.5 grams was prepared for placement in pressure vessel 212 by combining about 9.4 grams (57.2% of the 16.5-gram total) of the same ammonium nitrate mixture as that used for the ignition charge of this example together with about 7.1 grams (42.8% of the 16.5-gram total) of 10-micron guanidine nitrate. The resultant combination was mechanically mixed to obtain a uniform mixture of the ingredients.

EXAMPLE 10

In this example, the ignition charge comprises ammonium nitrate and hexahydro-1,3,5-trinitro-1,3,5-triazine (RDX). The ammonium nitrate comprises about 60% of the ignition charge mass, and the hexahydro-1,3,5-trinitro-1,3,5-triazine (RDX) comprises about 40% of the ignition charge mass. The main output charge comprises ammonium nitrate, guanidine nitrate and potassium perchlorate. The main output charge mass is about five to ten times the ignition charge mass. The ammonium nitrate in the main output charge comprises about 40% of the main output charge mass, the guanidine nitrate comprises about 50% of the main output charge mass, and the potassium perchlorate comprises about 10% of the main output charge mass.

To illustrate, approximately 9.3 grams of the 60-micron ammonium nitrate mixture as described in Example 1, above, was prepared for use in the ignition charge and in the main output charge. An ignition charge having a total mass of about 2.4 grams was prepared as follows. About 1.4 grams (59.4% of the 2.4-gram total) of the 60-micron ammonium nitrate mixture was mixed with about 1.0 grams (40.6% of the 2.4-gram total) of 150-micron hexahydro-1, 3,5-trinitro-1,3,5-triazine (RDX). The resultant combination was mechanically mixed to provide a uniform mixture of the ingredients.

The main output charge, having a total mass of about 20.0 grams, was prepared for placement in pressure vessel 212 by combining the following three components: (1) about 7.9 grams (39.5% of the 20.0-gram total) of the same ammonium nitrate mixture as that used for the ignition charge of this example, (2) about 9.9 grams (49.3% of the 20.0-gram total) of 10-micron guanidine nitrate, and (3) about 2.2 grams (11.2% of the 20.0 gram total) of 60-micron potassium perchlorate. The resultant combination was mechanically mixed to obtain a uniform mixture of the ingredients.

EXAMPLE 11

An ignition charge having a total mass of about 2.4 grams was prepared as described for the ignition charge of Example 10.

The main output charge, having a total mass of about 17.0 grams, was prepared for placement in pressure vessel 212 by combining about 15.7 grams (92.3% of the 17.0-gram total) of the same 60-micron ammonium nitrate mixture as that used for the ignition charge of this example, and about 1.3 grams (7.7% of the 17.0-gram total) of monobasic aluminum stearate (aluminum monostearate dihydroxide) having mean particle size less than one micron. The resultant combination was mechanically mixed to obtain a uniform mixture of the ingredients.

The method of operation for the embodiment of FIGS. 4A and 4B is as follows. The pre-deployed system is depicted in the drawings. If the vehicle in which the embodiment is housed is involved in a collision, the initiator is actuated to ignite the ignition charge. Initially ignition charge cup 226a is retained in place by the frictional force between the flanges at its two cylindrical ends and the inner wall of ignition chamber 226. This allows the output of the initiator to ignite ignition charge 224. The building pressure on the initiator side of the ignition charge cup causes the cup to move away from the initiator until the base of the cup contacts the base of pressure vessel 212. This exposes orifices 212e and allows the ignition materials to flow through these orifices. The ignition charge cup still covers fill port 226a, which prevents ignition materials from escaping through the fill port. The ignition materials are discharged in a controlled manner through orifices 212e into pressure vessel 212, which causes the conversion of main output charge 220 (the gas producing source) to the main gas. The mixing of the ignition materials with the main output charge is facilitated by the arrangement of orifices 212e. Placement of orifices 212e half way between the top and bottom interior of pressure vessel 212 minimizes the distance the ignition flame front needs to spread, thus further improving mixing of the ignition materials with the main output charge and better distributing the thermal energy of the ignition materials. As the main output charge reacts to form the main gas and the pressure builds in pressure vessel 212, burst disks 234 rupture to release the hot working gas through output control orifices 232 and into the airbag (not shown). During this process, the PV quantities of this system follow the curves depicted in FIG. 2.

Additional advantages and modifications will readily occur to those skilled in the art. For example, other types of contained volumes are within the scope of the invention. The contained volume may comprises a container having shapes and sizes other than those described above, it may be flexible or elastic, and it may be made of a variety of materials. The gas producing sources may comprise materials other than those listed above, provided that they can be appropriately converted into the main gas. The ignition system also is not limiting in the sense that it may comprise a variety of designs for achieving the function of causing the conversion of the gas producing source to the main gas, with or without creating an ignition gas. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A vehicle airbag inflator comprising:

a contained volume;

a gas producing source disposed within the contained volume for producing a main gas in the contained volume, the main gas comprising a working gas;

an initiating system in fluid or thermal communication with the gas producing source for causing the gas producing source to produce the main gas; and at least one exhaust orifice in fluid communication with the contained volume for providing an exhaust path for the working gas from the contained volume and for controlling the flow of the working gas as it is exhausted from the contained volume, the at least one exhaust orifice including at least one contained volume closure in or across the at least one exhaust orifice for selectively creating a fluid-tight seal in the contained volume;

the working gas creating a pressure-volume quantity in the contained volume ($PV_{cv}(t)$), the working gas has associated with it a pressure-volume quantity for the cumulative amount of the working gas ($PV_{cum}(t)$), and the working gas having associated with it a total pressure-volume quantity ($PV_{total}$) when the gas producing source is fully converted to the main gas;

the pressure-volume quantity in the contained volume ($PV_{cv}(t)$) reaching a peak ($PV_{peak}$) during the conversion of the gas producing source to the main gas that is at least about one half of the total pressure-volume quantity ($PV_{total}$).

2. A vehicle airbag inflator as recited in claim 1, wherein the contained volume comprises a pressure vessel having a substantially cylindrical shape.

3. A vehicle airbag inflator as recited in claim 1, wherein:

the contained volume has a measured internal volume; and the ratio of the total pressure-volume quantity ($PV_{total}$) to the measured internal volume of the contained volume is at least 12,000 psi.

4. A vehicle airbag inflator as recited in claim 1, further including an initial gas within the contained volume, the initial gas having associated with it an initial pressure-volume quantity ($PV_{cv}(t_o)$) prior to the conversion of the gas producing source to the main gas, the initial pressure-volume quantity being less than about 10% of the peak pressure-volume quantity ($PV_{peak}$).

5. A vehicle airbag inflator as recited in claim 1, wherein the contained volume has an internal pressure, prior to the conversion of the gas producing source to the main gas, of at most about one atmosphere.

6. A vehicle airbag inflator as recited in claim 1, wherein the contained volume comprises a pressure vessel having a substantially toroidal shape.

7. A vehicle airbag inflator as recited in claim 1, further including a combustion chamber contained within or in fluid communication with the contained volume for containing the gas producing source and for pre-combusting a portion of the gas producing source.

8. A vehicle airbag inflator as recited in claim 1, wherein:
the contained volume has a measured internal volume; and
the initiating system comprises an ignition chamber having a measured internal volume of at least about 10% of the measured internal volume of the contained volume.

9. A vehicle airbag inflator as recited in claim 1, wherein the initiating system comprises an ignition chamber within or in fluid communication with the contained volume, and an ignition chamber closure disposed in the ignition chamber and within or in fluid communication with the contained volume, wherein the ignition chamber closure ruptures to release the main gas into the contained volume when the pressure within the ignition chamber reaches approximately 10,000 psi.

10. A vehicle airbag inflator as recited in claim 1, wherein:
the initiating system includes an ignition charge that has an ignition charge energy;
the gas producing source has a gas producing source charge energy; and
the ignition charge energy is at least about 10% of the gas producing source charge energy.

11. A vehicle airbag inflator as recited in claim 1, wherein the contained volume closure comprises at least one rupture disk.

12. A vehicle airbag inflator as recited in claim 1, wherein:
the pressure in the contained volume reaches a total pressure when the at least one exhaust orifice is blocked; and
the contained volume closure has a mean opening pressure at which the contained volume closure opens, the mean opening pressure being about 50% to 75% of the total pressure in the contained volume.

13. A vehicle airbag inflator comprising:
a contained volume;
a gas producing source disposed within the contained volume for producing a main gas in the contained volume;
an initiating system in fluid or thermal communication with the gas producing source which produces an ignition gas and heat for causing the gas producing source to produce the main gas, the main gas and the ignition gas comprising a working gas; and
at least one exhaust orifice in fluid communication with the contained volume for providing an exhaust path for the working gas from the contained volume and for controlling the flow of the working gas as it is exhausted from the contained volume, the at least one exhaust orifice including at least one contained volume closure in or across the at least one exhaust orifice for selectively creating a fluid-tight seal in the contained volume;
the working gas creating a pressure-volume quantity in the contained volume ($PV_{cv}(t)$), the working gas having associated with it a pressure-volume quantity for the cumulative amount of the working gas ($PV_{cum}(t)$), and the working gas having associated with it a total pressure-volume quantity ($PV_{total}$) when the gas producing source is fully converted to the main gas;
the pressure-volume quantity in the contained volume ($PV_{cv}(t)$) reaching a peak ($PV_{peak}$) during the conversion of the gas producing source to the main gas that is at least about one half of the total pressure-volume quantity ($PV_{total}$).

14. A method for generating a gas, the method comprising:
prestoring a gas producing source;
beginning at a time $t_o$, converting the gas producing source into a main gas in a contained volume, the main gas comprising a working gas, the working gas creating a pressure-volume quantity in the contained volume ($PV_{cv}(t)$), the working gas having associated with it a pressure-volume quantity for the cumulative amount of the working gas ($PV_{cum}(t)$), and the working gas having associated with it a total pressure-volume quantity ($PV_{total}$) when the gas producing source is fully converted to the main gas; and
exhausting the working gas from the contained volume;
the pressure-volume quantity in the contained volume ($PV_{cv}(t)$) reaching a peak ($PV_{peak}$) during the conversion of the gas producing source to the main gas that is at least about one half of the total pressure-volume quantity ($PV_{total}$).

15. A method as recited in claim 14, further including pressurizing the contained volume with an initial gas, the initial gas having associated with it an initial pressure-volume quantity ($PV_{cv}(t_o)$) prior to the conversion of the gas producing source to the main gas, the initial pressure-volume quantity being less than about 10% of the peak pressure-volume quantity ($PV_{peak}$).

16. A method as recited in claim 14, wherein the contained volume has an internal pressure, prior to the conversion of the gas producing source to the main gas, of at most about one atmosphere.

17. A method as recited in claim 14, wherein:
the amount of the working gas exhausted from the contained volume corresponds to an exhaust pressure-volume quantity ($PV_{exhaust}(t)$);
the total amount of the working gas exhausted from the contained volume corresponds to a total exhausted pressure-volume quantity ($PV_{exhaust}(t_{final})$); and
the exhausting step includes exhausting an amount of the working gas so that the exhaust pressure-volume quantity ($PV_{exhaust}(t)$) reaches 90% of the total exhausted pressure-volume quantity ($PV_{exhaust}(t_{final})$) more than 20 milliseconds after time $t_o$.

* * * * *